(12) United States Patent
Chang (10) Patent No.: US 8,690,458 B2
(45) Date of Patent: Apr. 8, 2014

(54) OPTICAL CONNECTOR

(76) Inventor: Nai-Chien Chang, New Taipei (TW)

( * ) Notice: Subject to any disclaimer, the term of this patent is extended or adjusted under 35 U.S.C. 154(b) by 154 days.

(21) Appl. No.: 13/489,954

(22) Filed: Jun. 6, 2012

(65) Prior Publication Data

US 2013/0022322 A1 Jan. 24, 2013

(30) Foreign Application Priority Data

Jul. 22, 2011 (TW) .............................. 100213603 U (51) Int. Cl.
*G02B 6/36* (2006.01)
(52) U.S. Cl.
USPC .............................................. 385/92; 385/89
(58) Field of Classification Search
USPC ..................................................... 385/89, 92
See application file for complete search history.

(56) References Cited

U.S. PATENT DOCUMENTS

2011/0311187 A1* 12/2011 Wang et al. ..................... 385/78

* cited by examiner

*Primary Examiner* — Uyen Chau N Le
*Assistant Examiner* — Kajli Prince
(74) *Attorney, Agent, or Firm* — Chun-Ming Shih; HDLS IPR Services (57) ABSTRACT

An optical connector mainly includes a base and a mount. The base has a first slot. The base has a receiving space for arranging the optical component. The mount has an adapting end inserted into the first slot. A connecting port is formed on the adapting end. The base is connected with an external wire through the connecting port. The adapting end has an opening corresponding to the position of a tunnel of the base. Thus, when the external wire is inserted into the connecting port, the optical component can receive an optical signal from the external wire through the tunnel of the base and the opening on the mount.

11 Claims, 15 Drawing Sheets

OPTICAL CONNECTOR

BACKGROUND OF THE INVENTION

1. Field of the Invention

The invention relates to connectors, in particularly to an optical connector for inserting with various kinds of external wires.

2. Description of Related Art

As the electronic industry growing rapidly, nowadays various kinds of electronic devices are used in our daily lives. For inputting commands to control the electronic devices, or transmitting information from one electronic device to another, at least one connector is arranged on a circuit board of the electronic device.

For example, a personal computer usually has a plurality of connectors such as universal serial bus (USB) connectors, external serial advance technology attachment (e-SATA) connectors, RJ-45 connectors, high definition multimedia interface (HDMI) connectors. With the connectors, the personal computer is capable of communicating with external controlling devices and receiving controlling commands, or the personal computer can be connected to another electronic device for mutually transmitting information.

However, as technology keeps improving, information transmission rate required by users is getting higher and higher. The traditional transmission rate of coppers wire can not meet the requirement any more. Therefore, one or more optical fiber wires with optical connector have been added into the conventional electronic connector for increasing the transmission rate. Moreover, an optical connector and a corresponding transmission line are used for replacing conventional transmission connector and transmitting information only through the optical connector. In practice, future connector apparatus adopting optical connector and optical fiber wire for transmitting various format signals may have a similar look of a conventional connector.

However, for being capable of connecting with various kinds of transmission lines, electronic devices have to be added with many optical connectors having different interface on their mainboards. The optical connectors may occupy the limited room on the mainboard. If there are many optical connector and the many conventional connectors have to be arranged on the mainboard, the available room on the mainboard will not be enough.

SUMMARY OF THE INVENTION

The primary objective is to provide an optical connector, capable of replacing multiple kinds of detachable mounts for connecting with various kinds of external wires for transmitting optical signal.

For achieving above objective, the present invention provides an optical connector for electrically connecting to a mainboard of an external electronic device, the optical connector mainly includes a base and a mount. The base has a first slot formed on a front surface thereof. The base has a receiving space. The optical component is arranged in the receiving space and has an optical receiving portion and a plurality of welding terminals. The welding terminals are bent and downwardly extend and protrude out of from the base. The optical connector is electrically connected to the mainboard through the welding terminals. The mount has an adapting end and a connecting end away from the adapting end. The connecting end has a connecting port. The adapting end has an opening communicating to the connecting port. The mount is inserted into the first slot of the base through the adapting and the position of the opening corresponds to the position of the optical receiving portion of the optical component.

In comparison to the related art, in order to improve transmission rate of information, various kinds of transmission lines adopt optical fiber for transmitting information instead of copper wire. By using different kinds of mounts, the optical connector of the present invention can be inserted with various kinds of external wire, and transmit optical signal with the optical fiber of the external wire. Thus, only the optical connector of the present invention is needed to arrange on the mainboard of the electronic device for connecting with various kinds of external wire. The available room on the mainboard will be increased, and the usage convenience can be improved.

DETAILED DESCRIPTION OF THE INVENTION

A detailed description of the present invention will be made with reference to the accompanying drawings.

Figure 1:
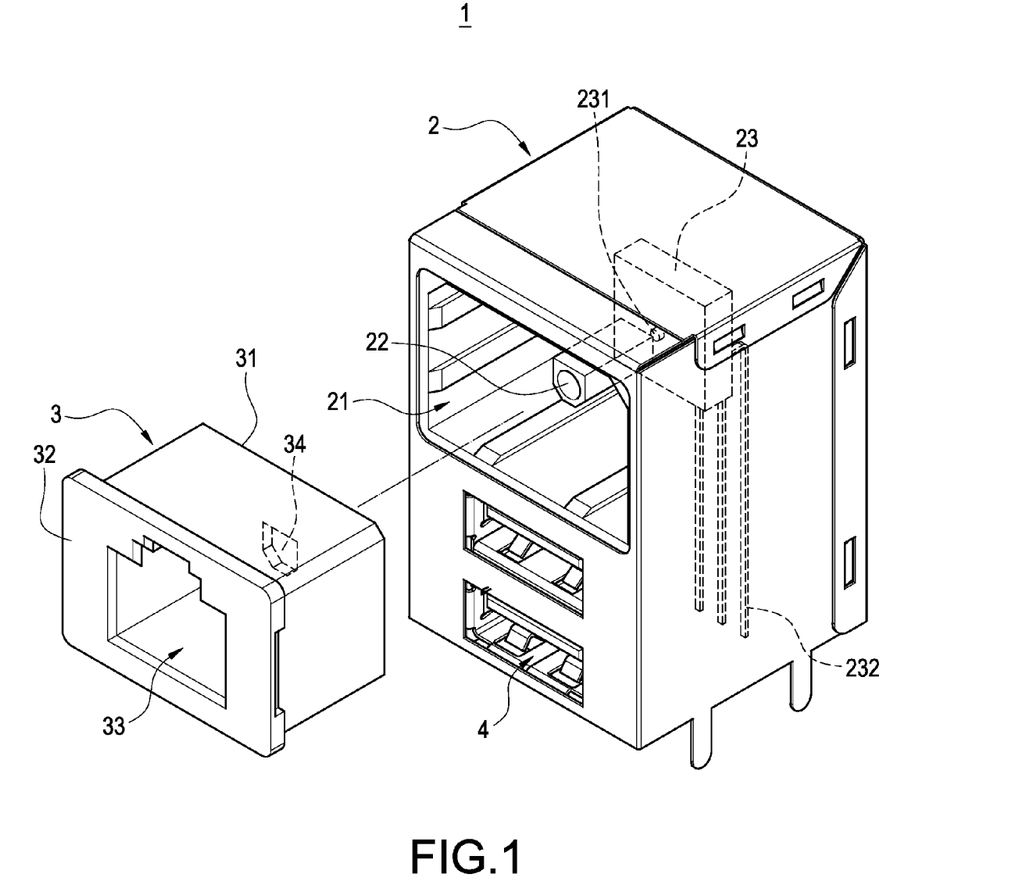
FIG. 1 is an exploded view of the first embodiment of the present invention.
Figure 2:
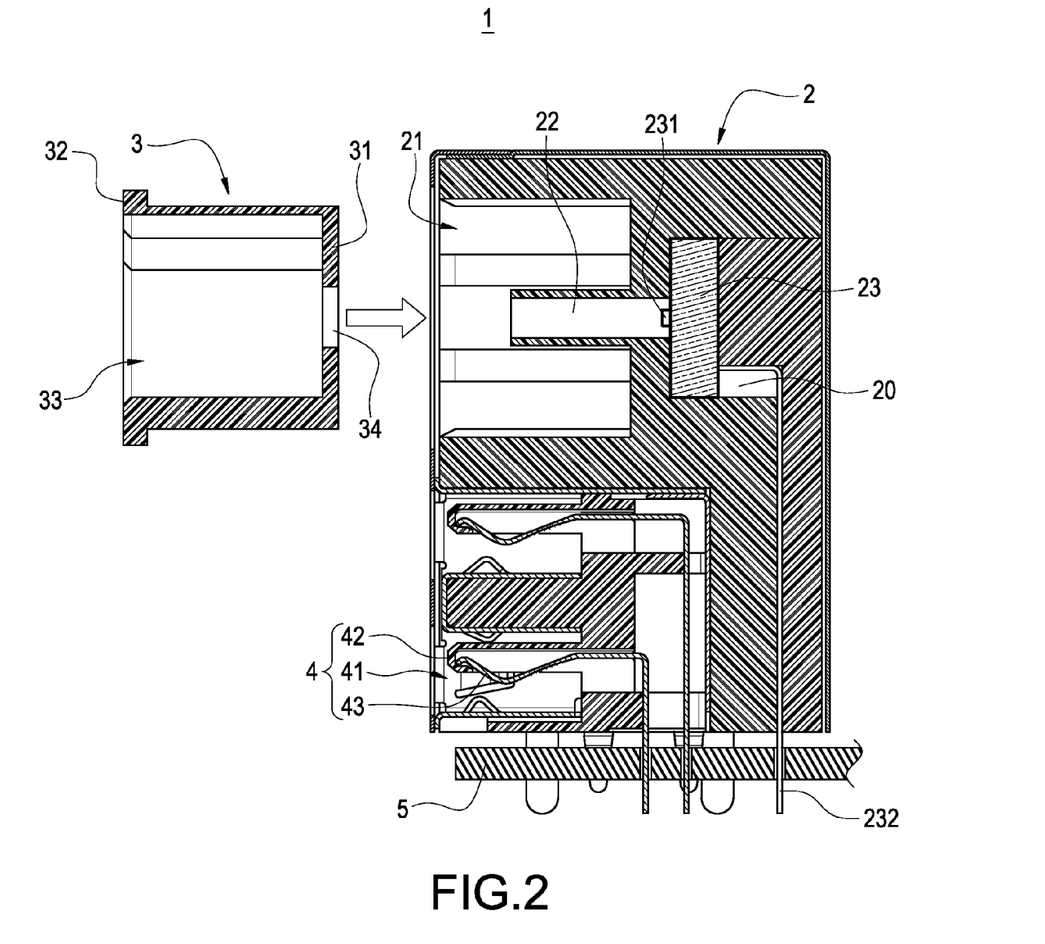
FIG. 2 is a sectional view of the first embodiment of the present invention.
Figure 3:
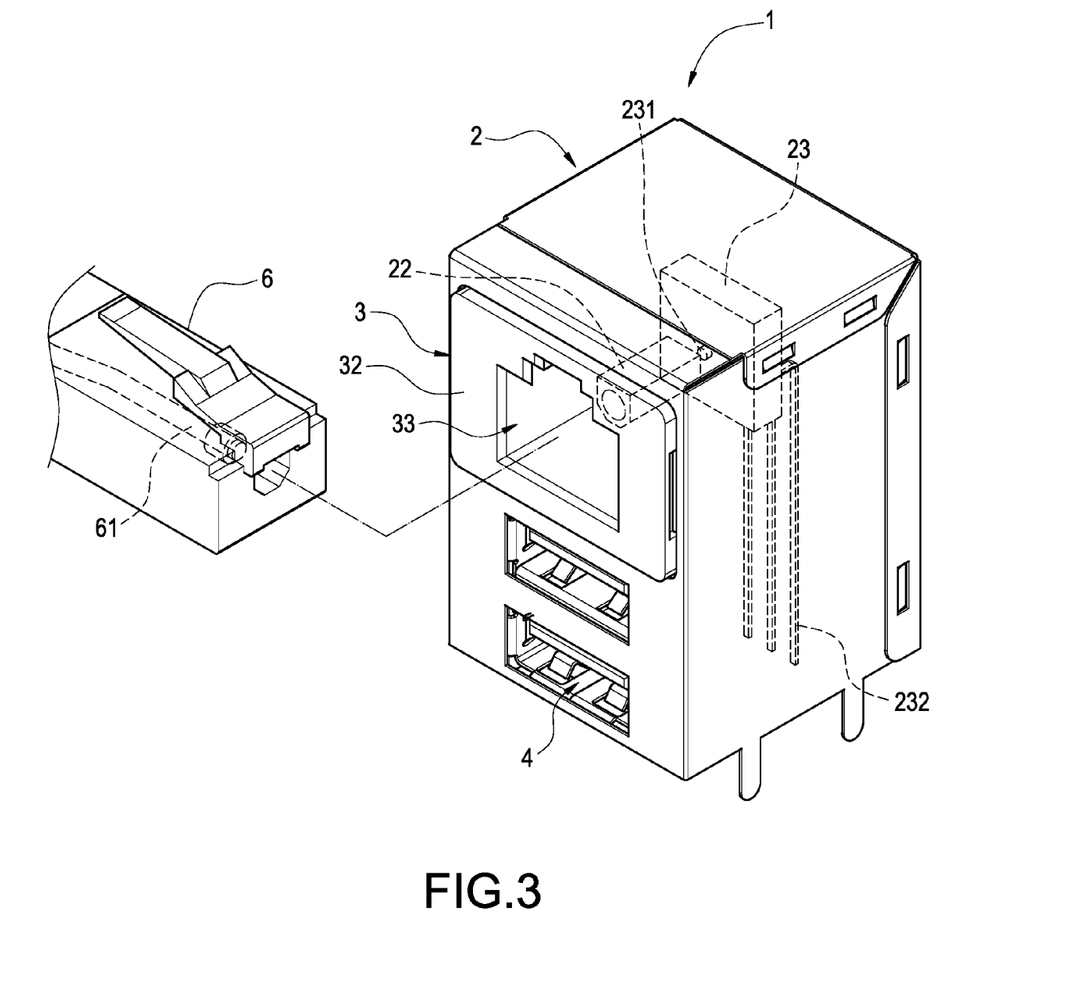
FIG. 3 is a perspective view of the first embodiment of the present invention.

FIG. 1 and FIG. 2 are an exploded view and a sectional view according to the first embodiment of the present invention. The optical connector 1 mainly includes a base 2 and a mount 3 inserted into the base 2. In this embodiment, the optical connector 1 has many kinds of mounts 3 for different kinds of uses. Each kind of the mounts 3 corresponds to a specific type of external wire 6 (as shown in FIG. 3). The mount 3 is not in electrically connection with the base 2 or the external wire 6. The base 3 has a shape in correspondence with the shape of the external wire 6 and thus for fixing the external wire 6.

The base 2 has a first slot 21 formed on a front surface thereof for connecting with the mount 3. The base 2 has a receiving space 20, where an optical component 23 is arranged. The optical component 23 has an optical receiving portion 231 and a plurality of welding terminals 232. The number of the welding terminals 232 can be, for example, three. More specifically, one ends of the welding terminals 232 are electrically connected to the optical receiving portion 231. The other ends of the welding terminals 232 are bent from the optical receiving portion and downwardly extend and protrude out from the base 2. Then, the optical connector 1 can be electrically connected to a mainboard 5 of an external electronic device through the welding terminals 232 and for mutually transmitting optical signals.

The base 2 has a tunnel 22 for communicating the receiving space 20 and the first slot 21. The position of the tunnel 22 corresponds to the position of the optical receiving portion 231 of the optical component 23. The optical receiving portion 231 is connected to the first slot 21 through the tunnel 22.

The base mainly includes an adapting end 31 and a connecting end 32 away from the adapting end 31. The adapting end 31 of the mount 3 is connected to the first slot 21 of the base 2. A connecting port 33 is formed on the connecting end 32. And an opening 34 is formed on the adapting end 31 and communicated to the connecting port 33. The position of the opening 34 is in accordance with the position of the tunnel 22 of the base 2 and the position of the optical receiving portion 231 of the optical component 23.

Figure 4:
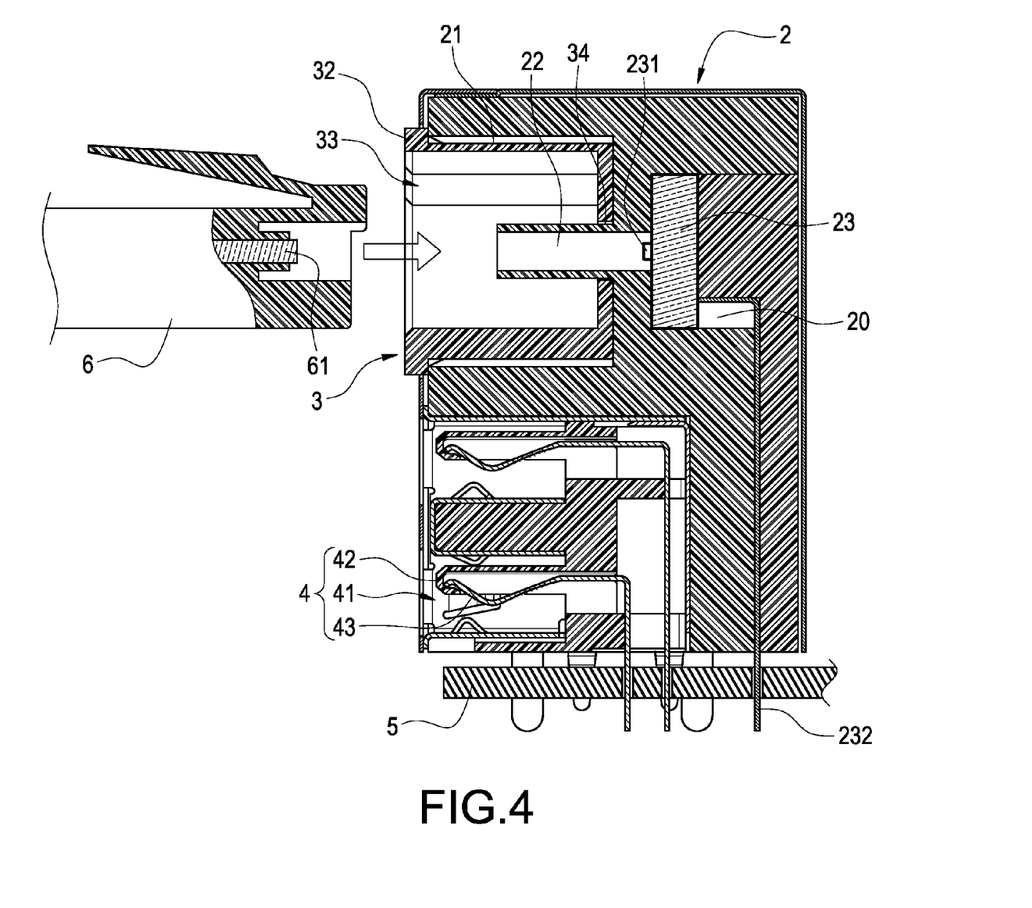
FIG. 4 is another sectional view of the first embodiment of the present invention.

FIG. 3 and FIG. 4 are a perspective view and a sectional view according to the first embodiment of the present invention. The tunnel 22 of the base 2, the optical receiving portion 231, and the opening 34 are in positional correspondence with each other. When the mount 3 is connected to the base 2, the optical receiving portion 231 is connected to the connecting port 33 of the mount 3 through the tunnel 22 and the opening 34.

As shown in FIG. 3, the shape of the connecting port 33 of the mount 3 corresponds to the shape of a RJ-45 connecting port for connecting with an external wire 6 of a RJ-45 formation. More specifically, the optical connector 1 adopts the connecting port 33 as a socket for firmly fixing the external wire 6 not to get loose and for accurately communicating optical signal with the optical component 23 in the base 2.

In this embodiment, the external wire 6 is an optical wire containing optical connector 61. As FIG. 3 and FIG. 4 show, the external wire 6 can have a shape of a male RJ-45 connector, but adapting optical connector 61 instead of the copper wire of the conventional connector for transmitting optical signal of a RJ-45 formation.

Figure 5:
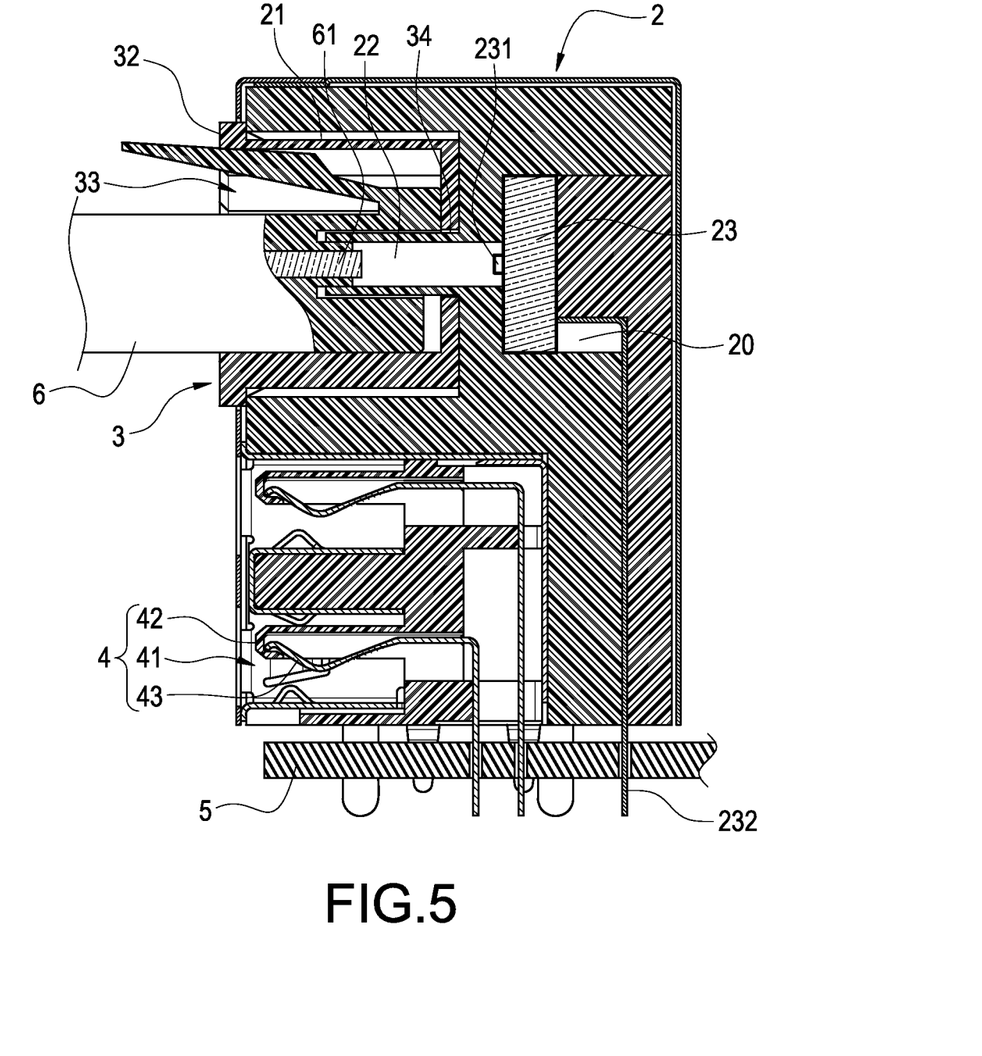
FIG. 5 is a wiring diagram of the first embodiment of the present invention.

FIG. 5 is a wiring diagram according to the first embodiment of the present invention. When the external wire 6 is connected to the connecting port 33 of the mount 3, the optical connector 61 can face the optical receiving portion 231 of the optical component 23 through the tunnel 22. The optical receiving portion 231 of the optical component 23 and the external wire 6 can transmit optical signal with each other. And the optical component 23 can transmit optical signal to the mainboard 5 through the welding terminals 232 and receive optical signal to be transmitted outwardly from the mainboard 5.

It is worth mention that in this embodiment at least one electronic connector 4 can be arranged below the first slot 21. The optical connector 1 is a stacked connector capable of transmitting optical signal as well as electronic signal.

More specifically, the base 2 of the optical connector 1 has at least one second slot 41 formed below the first slot 21. The second slot 41 has a tongue portion 42 and a plurality of connecting terminals 43. A electronic connector 4 is constituted of the second slot 41, the tongue portion 42 and the connecting terminals 43. One ends of the connecting terminals 43 are arranged on the tongue portion 42 for electrically connecting to the external wire (not shown). The other ends of the connecting terminals 43 protrude out from the base 2 and electrically connect to the mainboard 5. The number of the electronic connectors is plural. In FIG. 1, the number is two, but not limited thereto.

In this embodiment, the format of the electronic connector 4 is a universal serial bus (USB) for example. However, in practical the electronic connector 4 can be a external serial advance technology attachment (e-SATA) connector, high definition multimedia interface (HDMI) or a DisplayPort connector and not limited thereto.

Figure 6:
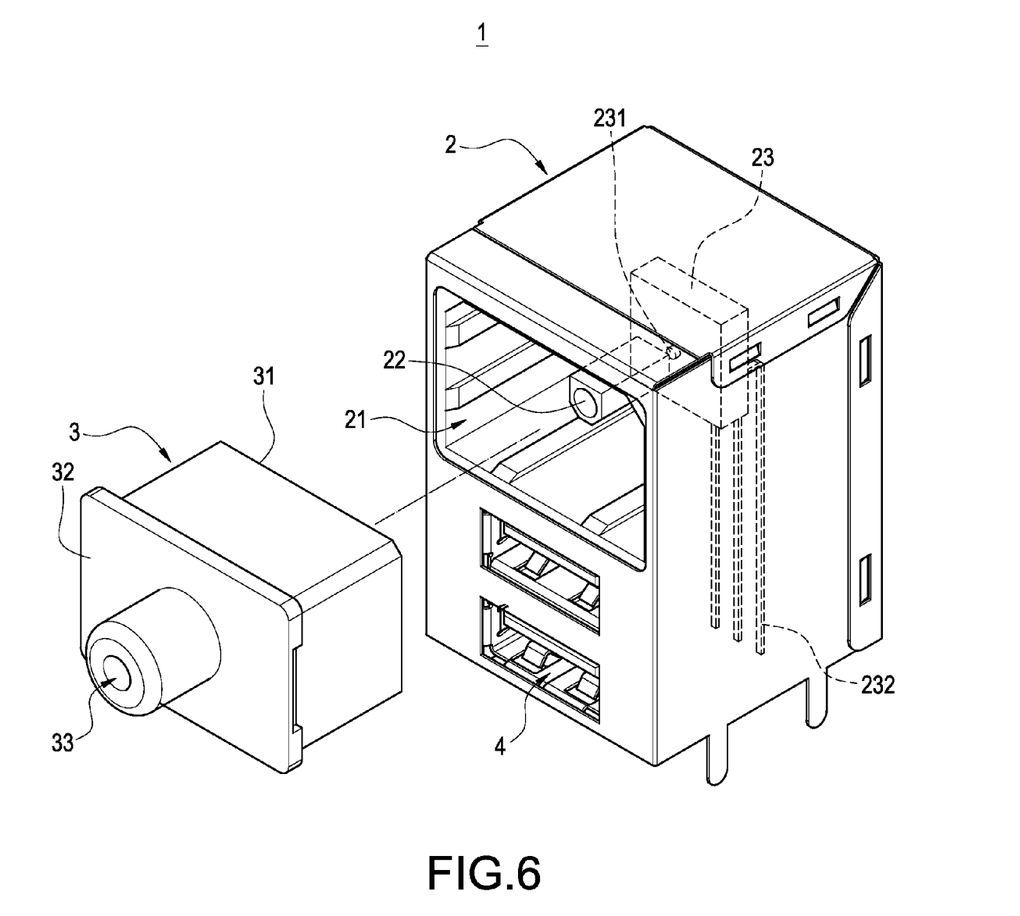
FIG. 6 is an exploded view of the second embodiment of the present invention.
Figure 7:
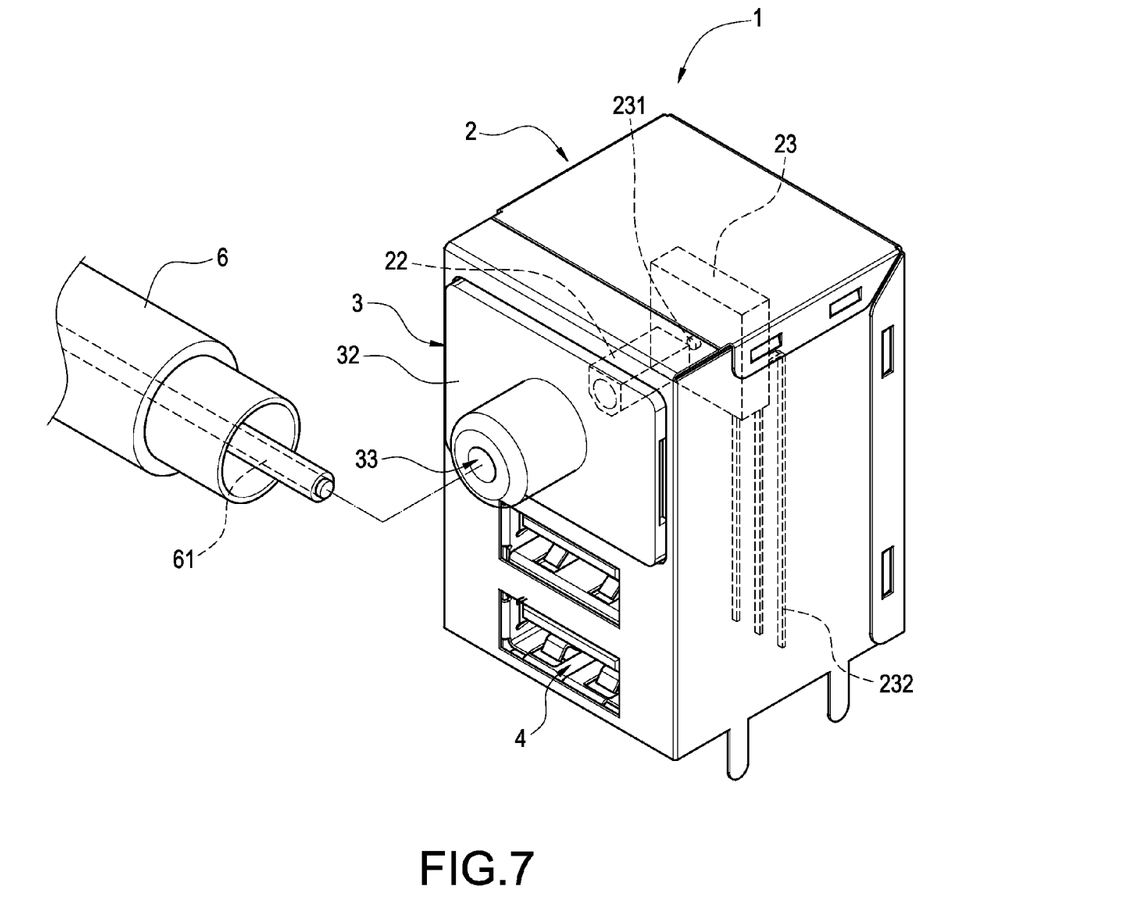
FIG. 7 is a perspective view of the second embodiment of the present invention.

FIG. 6 and FIG. 7 are respectively an exploded view and a perspective view according to the second embodiment of the present invention. The connecting port 33 of the mount 3 corresponds to a composite video connecting port. Thus, when the mount 3 is mounted to the base 2, an external wire 6 of composite video format can be connected to the optical connector 1 through the connecting port 33 for transmitting the optical signal of composite video format.

Figure 8:
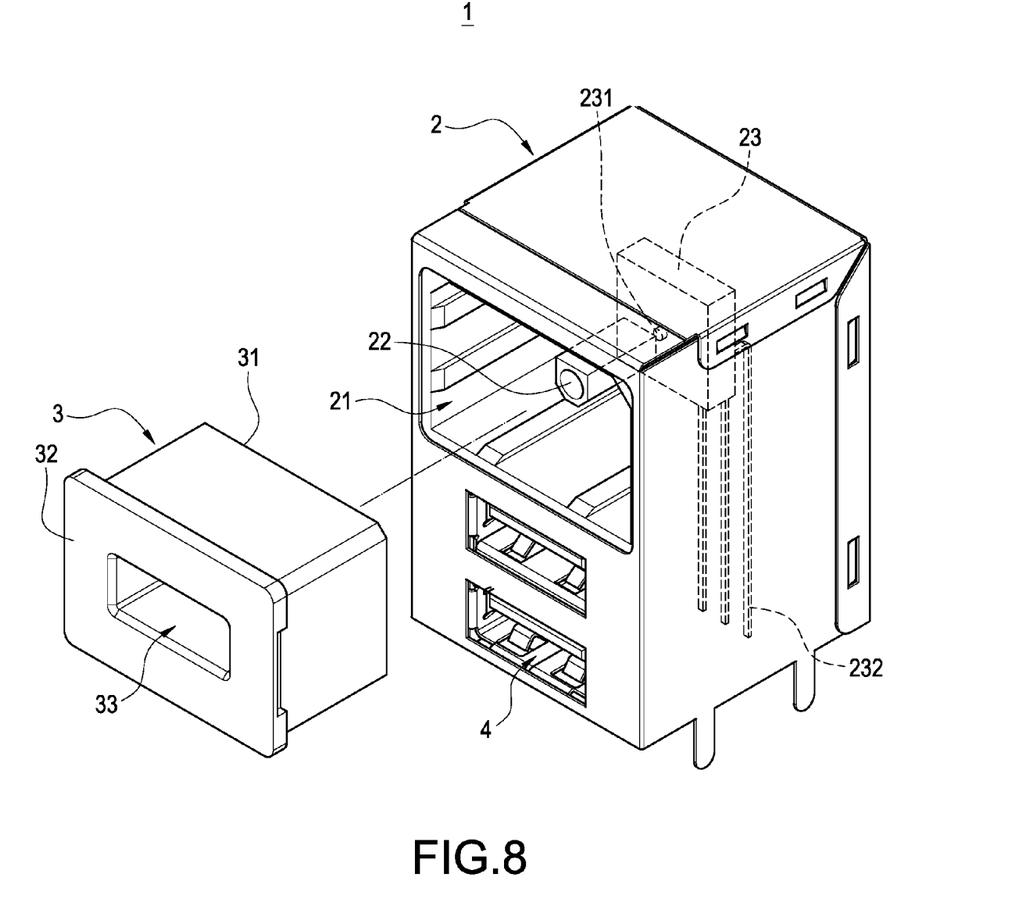
FIG. 8 is an exploded view of the third embodiment of the present invention.
Figure 9:
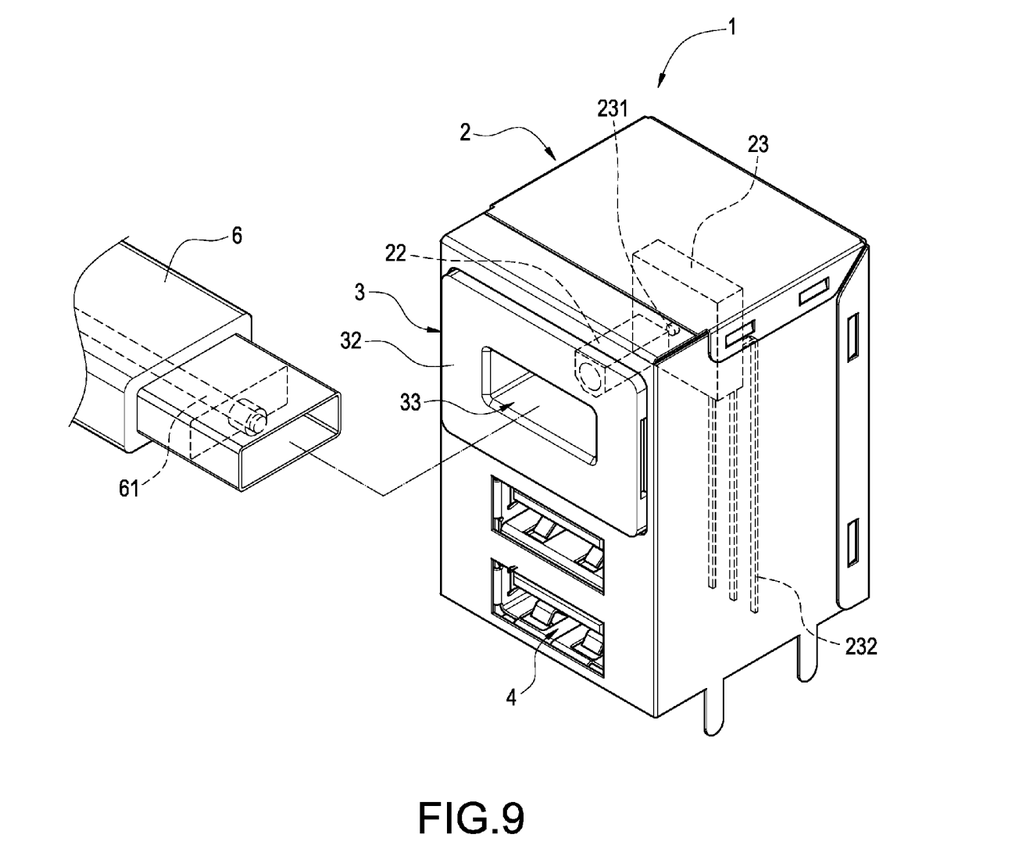
FIG. 9 is a perspective view of the third embodiment of the present invention.

FIG. 8 and FIG. 9 are respectively an exploded view and a perspective view according to the third embodiment of the present invention. As shown, the connecting port 33 of the mount 3 corresponds to the shape of a USB connecting port. Therefore, when the mount 3 is mounted to the base 2, an external wire 6 of the USB format can be connected to the optical connector 1 through the connecting port 33 for transmitting optical signal of USB format.

Figure 10:
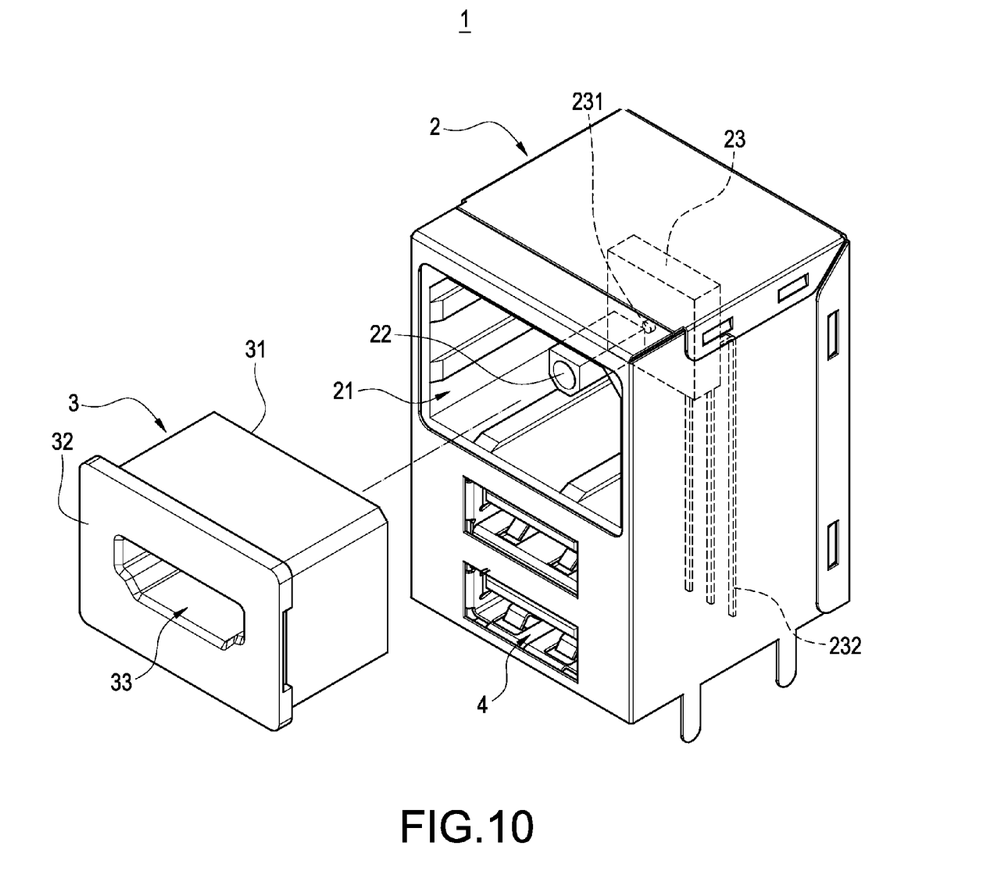
FIG. 10 is an exploded view of the forth embodiment of the present invention.
Figure 11:
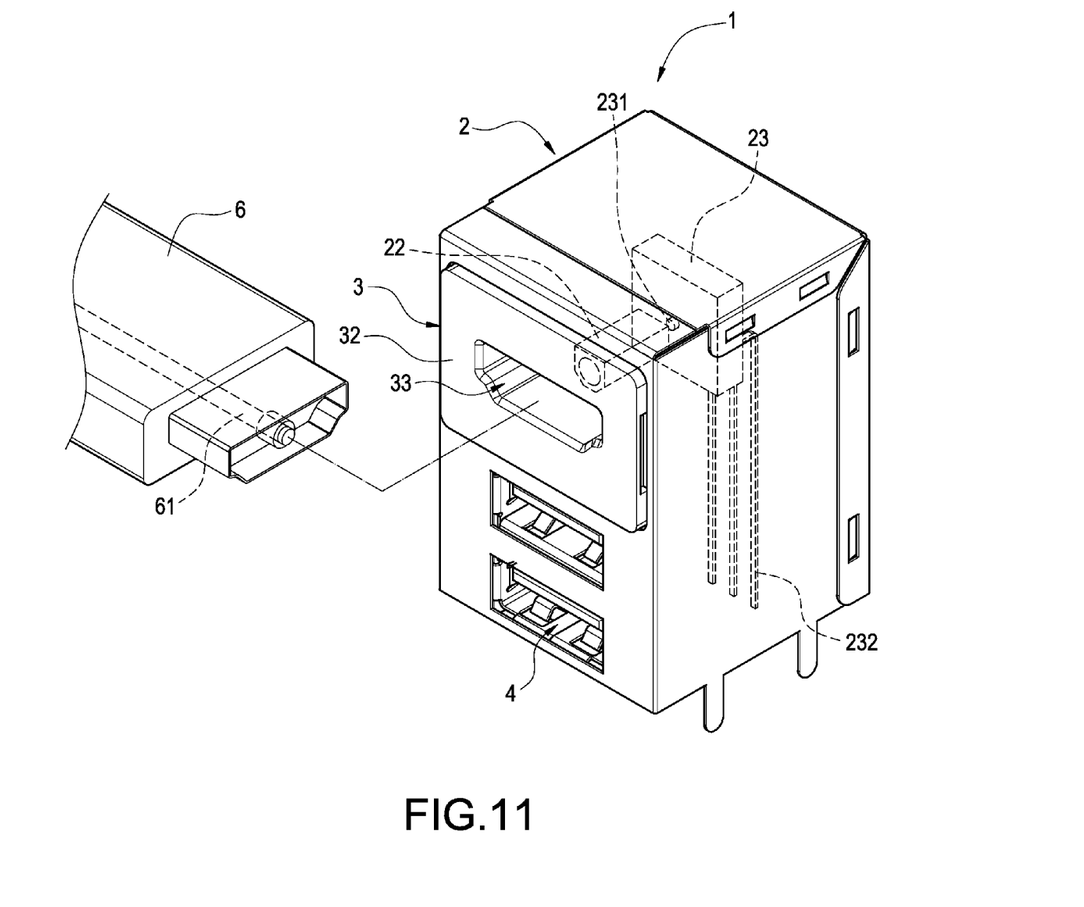
FIG. 11 is a perspective view of the forth embodiment of the present invention.

FIG. 10 and FIG. 11 are respectively an exploded view and a perspective view according to the forth embodiment of the present invention. As shown, when the mount 3 is mounted to the base 2, an external wire 6 of the HDMI format can be connected to the optical connector 1 through the connecting port 33 for transmitting optical signal of HDMI format.

Figure 12:
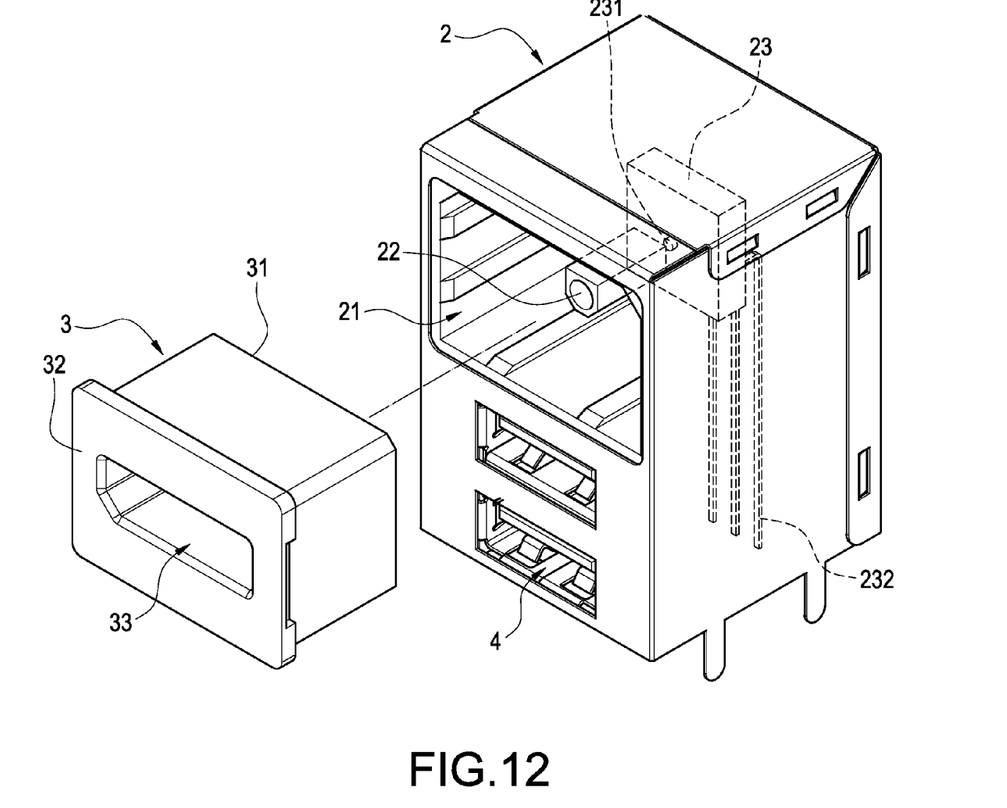
FIG. 12 is an exploded view of the fifth embodiment of the present invention.
Figure 13:
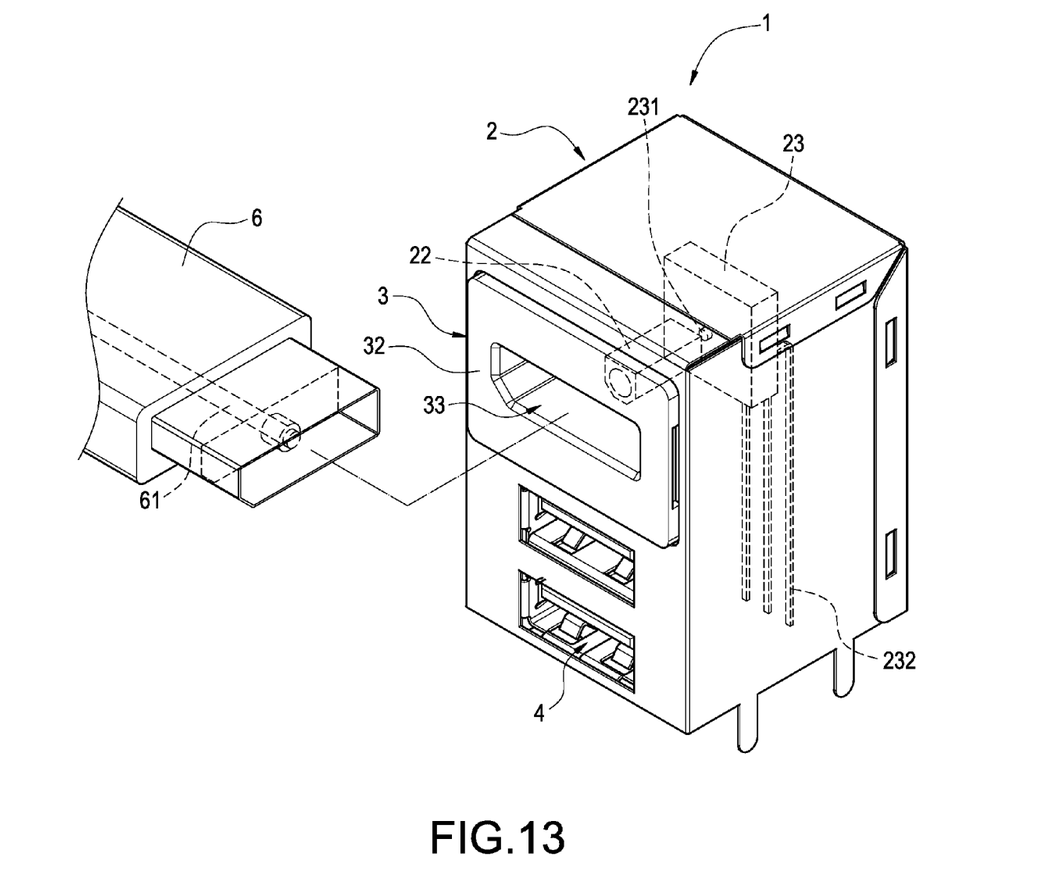
FIG. 13 is a perspective view of the fifth embodiment of the present invention.

FIG. 12 and FIG. 13 are respectively an exploded view and a perspective view according to the fifth embodiment of the present invention. As shown, when the mount 3 is mounted to the base 2, an external wire 6 of the DisplayPort format can be connected to the optical connector 1 through the connecting port 33 for transmitting optical signal of DisplayPort format.

Figure 14:
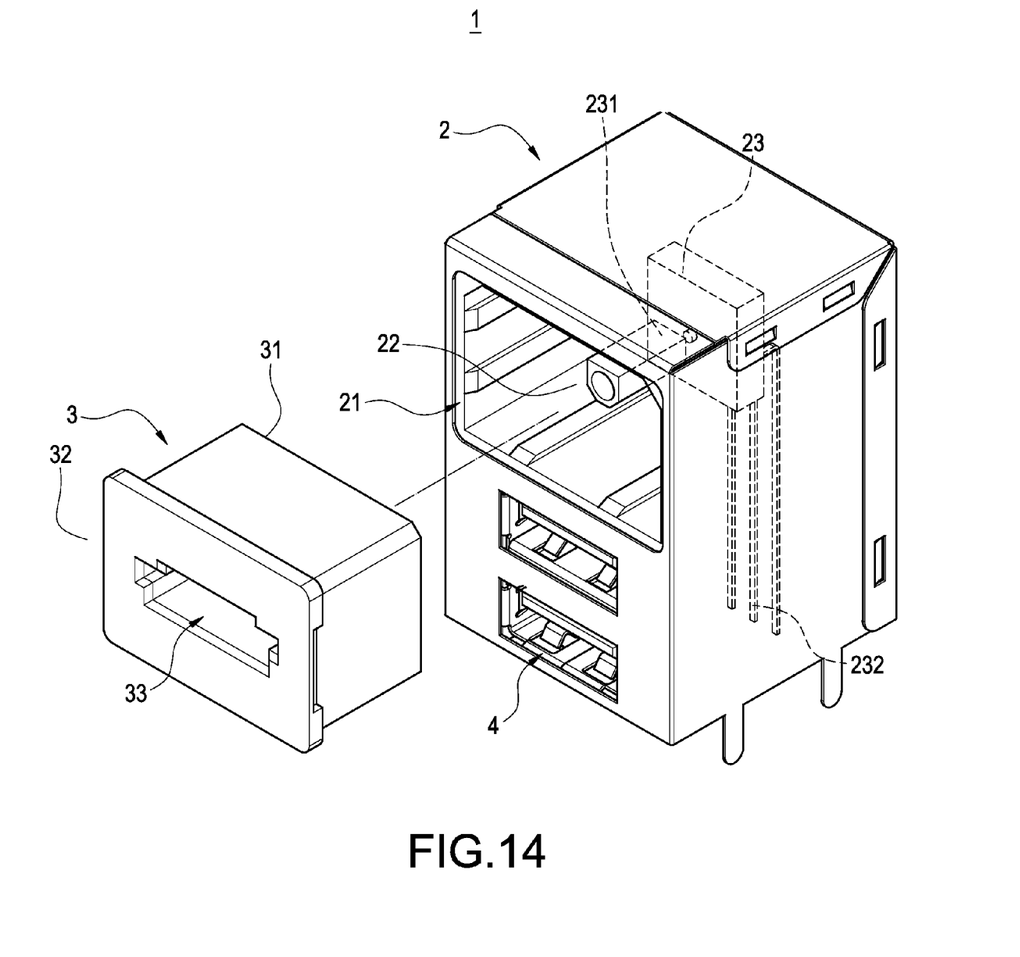
FIG. 14 is an exploded view of the sixth embodiment of the present invention.
Figure 15:
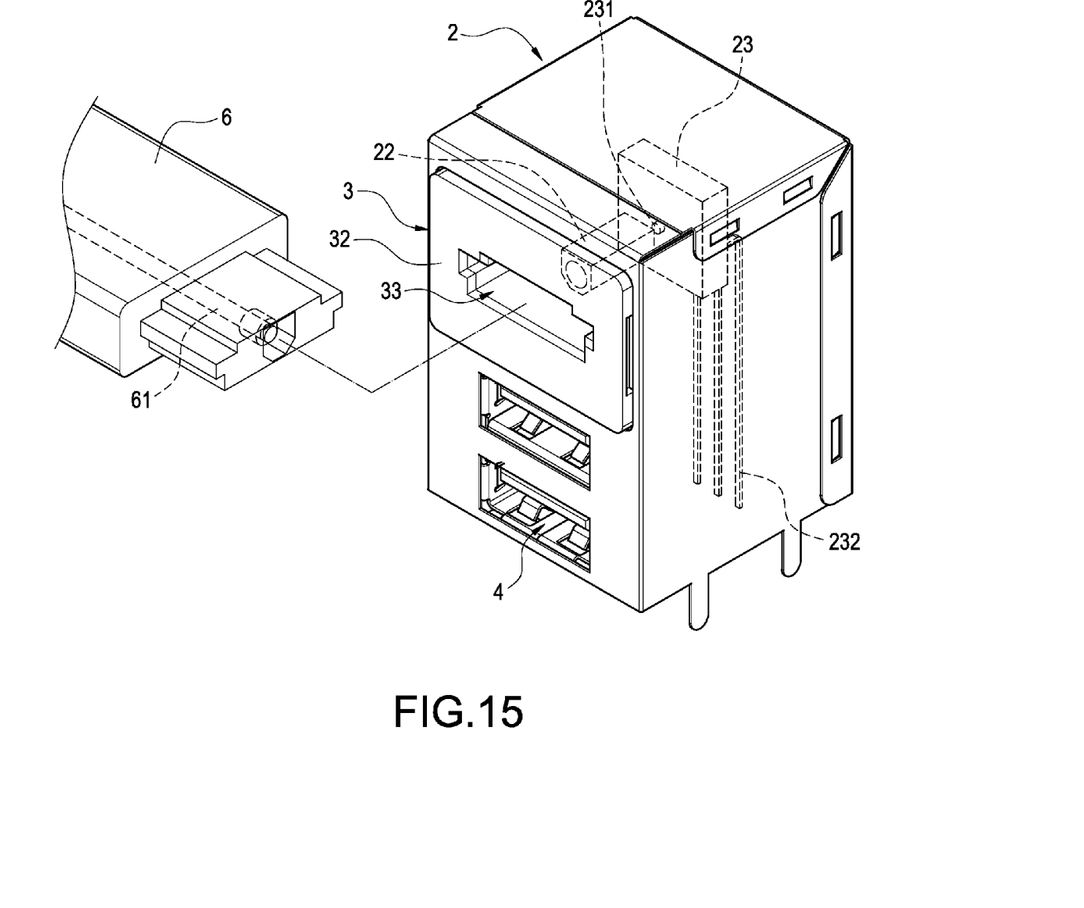
FIG. 15 is a perspective view of the sixth embodiment of the present invention.

FIG. 14 and FIG. 15 are respectively an exploded view and a perspective view according to the sixth embodiment of the present invention. As shown, when the mount 3 is mounted to the base 2, an external wire 6 of the eSATA format can be connected to the optical connector 1 through the connecting port 33 for transmitting optical signal of eSATA format.

However, the above mentions are only embodiments of the present invention, the main objective is to provide the detachable mount 3 for the optical connector 1 to connected with various types of the optical fiber wire, and transmitting all kinds of optical signals by the optical component 23. No matter what the shape of the optical wire is, the optical connector can connect to by replacing the mount 3.

Although the present invention has been described with reference to the foregoing preferred embodiments, it will be understood that the invention is not limited to the details thereof. Various equivalent variations and modifications can still occur to those skilled in this art in view of the teachings of the present invention. Thus, all such variations and equivalent modifications are also embraced within the scope of the invention as defined in the appended claims.

What is claimed is:

1. An optical connector for electrically connecting to a mainboard of an external electronic device, the optical connector comprising:

a base having a first slot formed on a front surface thereof, the base having a receiving space, an optical component being arranged in the receiving space and having an optical receiving portion and a plurality of welding terminals, the welding terminals being bent and downwardly extending and protruding out of from the base, the optical connector being electrically connected to the mainboard through the welding terminals; and a mount having an adapting end and a connecting end away from the adapting end, the connecting end having a connecting port, the adapting end having an opening communicating to the connecting port, wherein the mount is inserted into the first slot of the base through the adapting end and the position of the opening corresponds to the position of the optical receiving portion of the optical component.

2. The optical connector as claim 1, wherein the base has a tunnel, the position of the tunnel corresponds to the optical receiving portion and the position of the opening of the mount, the optical receiving is connected to the opening of the base through the tunnel and the opening of the base, when an external wire is inserted into the connecting port, the optical component transmits optical signal to the optical receiving portion through the optical receiving portion.

3. The optical connector as claim 2, wherein the shape of the connecting port corresponds to the shape of a RJ-45 connecting port for connecting with an external wire of RJ-45 format.

4. The optical connector as claim 2, wherein the shape of the connecting port of the base corresponds to the shape of a composite video connecting port for connecting with an external wire of composite video format.

5. The optical connector as claim 2, wherein the shape of the connecting port of the base corresponds to the shape of a USB connecting port for connecting with an external wire of USB format.

6. The optical connector as claim 2, wherein the shape of the connecting port of the base corresponds to the shape of a HDMI connecting port for connecting with an external wire of HDMI format.

7. The optical connector as claim 2, wherein the shape of the connecting port of the base corresponds to the shape of a DisplayPort connecting port for connecting with an external wire of DisplayPort format.

8. The optical connector as claim 2, wherein the shape of the connecting port of the base corresponds to the shape of an eSATA connecting port for connecting with an external wire of eSATA format.

9. The optical connector as claim 1, wherein at least one electronic connector is arranged below the first slot.

10. The optical connector as claim 9, wherein at least one second slot is formed below the first slot, the second slot has a tongue portion and a plurality of connecting terminals on the tongue portion, one ends of the connecting terminals protrude out from the base for electrically connecting to the mainboard, and the electronic connector is constituted of the second slot, the tongue portion, and the connecting terminals.

11. The optical connector as claim 10, wherein the electronic connector is a USB connector, an eSATA connector, a HDMI connector, a DisplayPort connector or a combination thereof.

* * * * *